United States Patent [19]
Mouchotte

[11] Patent Number: 4,710,617
[45] Date of Patent: Dec. 1, 1987

[54] METHOD OF PROTECTING SECURITY DOCUMENTS

[75] Inventor: Daniel G. E. Mouchotte, Golfe Juan, France

[73] Assignee: Cimsa Sintra (S.A.), France

[21] Appl. No.: 866,370

[22] Filed: May 23, 1986

[51] Int. Cl.[4] .................. G06K 19/00
[52] U.S. Cl. .................. 235/487; 235/488
[58] Field of Search .................. 235/487, 488

[56] References Cited

U.S. PATENT DOCUMENTS 4,363,984 2/1982 Morow et al. .................. 235/487 X

*Primary Examiner*—Harold I. Pitts

*Attorney, Agent, or Firm*—Steele, Gould & Fried

[57] ABSTRACT

The method is applicable to protecting security documents of the type comprising a substrate bearing information which is to be protected from tampering, together with transparent protective layers of thermoplastic material heat sealed around said substrate. The method provides a set of pigment-retaining micro-holes in the substrate, said pigment being soluble in protective layer solvents. Any attempt at dissolving away the protective layers to gain access to the support for tampering with the information thereon, will also have the effect of making tell-tale marks on the support, as it absorbs the pigment is spread in the thickness of the support like ink in blotting paper.

4 Claims, 2 Drawing Figures

METHOD OF PROTECTING SECURITY DOCUMENTS

The present invention relates to a method of protecting security documents, and is intended particularly, but not exclusively, for protecting documents such as passports or identity cards. The invention also relates to documents obtained by the method.

BACKGROUND OF THE INVENTION

It is well known that such documents as established by national administrations and other authorities must be as safe as possible against being tampered with in order to be quite certain of the identity of the bearer.

European published patent application No. EP-A-0 013 418 describes a method of manufacturing a card comprising two transparent outer protective layers, e.g. made of polyvinyl chloride, two inner layers, and a perforated or porous protected layer which is inserted between said inner layers and which allows the material of said inner layers to penetrate therein on melting, thereby making a seal.

U.S. Pat. No. 3,836,754 describes an identification card having a plurality of areas of different optical transmission coefficients at a given wavelength of light, e.g. holes filled with colored galatene.

U.S. Pat. No. 3,802,101 describes an encoded identity card including a sheet having a metal core which is pierced by openings which in turn are covered with transparent plastic sheets.

Proposals have already been made to prepare such documents in the following manner:

Identification information is applied by any suitable means (e.g. printing and/or transferring decals) onto a paper or card medium which may optionally be covered with a layer of polyethylene or gelatin, and on which a security background is preferably pre-printed. The resulting substrate is then covered on its front and back surfaces with one or more layers of un-peelable protection. In an identity card of known type, the paper is covered with a complex of polyester and polyethylene. The protective layers are caused to adhere to the substrate by heat sealing.

Under such conditions, forgers seeking to tamper with information recorded on a card merely soak the card in a bath of one or more known polyethylene solvents such as xylene, acetone, methylethylcetone, benzene alcohols, etc., thereby dissolving the polyethylene after a few hours, and giving access to the paper (on which traces of polyethylene may sometimes remain). Once accessible, the document is altered, and subsequently its protective layers are reconstituted in such a manner as to ensure that the document has the same general appearance as before.

Preferred implementations of the present invention mitigate the above drawback by showing up any attempt at tampering with the original information.

SUMMARY OF THE INVENTION

According to the present invention, the method of protecting documents includes providing a set of pigment-retaining micro-holes in the substrate, said pigment being soluble in protective layer solvents.

The micro-holes are not normally visible on the finished document. However, the micro-holes allow the solvent or the mixture of solvents to enter and dissolve the pigment. In addition, the micro-holes locally break the substrate's liquid-proof surface glazing layer, e.g. of polyethylene. As a result, a solution of pigment in solvent encounters paper which is untreated and hence absorbent around the walls of the microholes. The pigmented solution is therefore absorbed in the same way as ink is absorbed by blotting paper, and indelible spots appear in the thickness of the paper itself. It is thus immediately apparent whether or not a card has been tampered with by soaking it in solvent.

Advantageously, the micro-holes are disposed in the card in such a manner as to form a warning symbol or mark, eg. a word such as "CANCELLED". This makes tampering even more obvious.

BRIEF DESCRIPTION OF THE DRAWING

An implementation of the invention is described, by way of example, with reference to the accompanying drawing, in which.

MORE DETAILED DESCRIPTION

Figure 1:
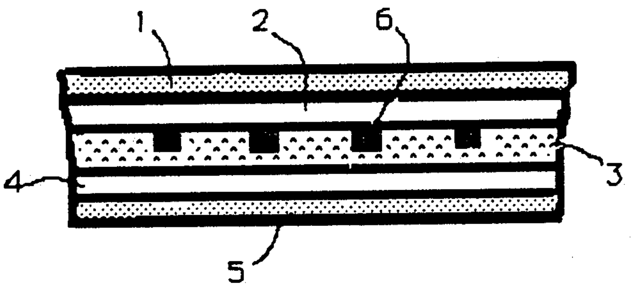
FIG. 1 is a vertical section through a portion of a card implementing the invention.

FIG. 1 shows an information-supporting medium 3 constituted by a sheet of paper or card and covered with protective layers 1, 2, 4, and 5. These protective layers may be made of transparent plastic; for example the outermost layers 1 and 5 may be made of polyester, and the intermediate layers 2 and 4 may be made of polyethylene. The sheet 3 may itself be covered with gelatin or with a two or three micron thick polyethylene covering for receiving information by transfer, e.g. by photographic direct transfer reversal (DTR). The paper medium 3 is preferably pre-printed with a security background which may optionally include light-emitting points or any other suitable detection means on at least one of its faces.

After the card has received the required information, but prior to being heat sealed in its protective layers 1, 2, 4, 5, pigment-retaining micro-holes in accordance with the invention are punched therein. This operation is advantageously performed by the same machine as the machine which applies the required information on the card, and it may be done by means of rolls bearing needles which are tipped with particles of pigment or with very small quantities of pigment paste. As the card moves longitudinally, the roll turns about its axis and pricks the surface of the card in such a manner as to make the said pigment-retaining micro-holes therein. The pigment may be conveyed to the needles by a three-cylinder device.

Figure 2:
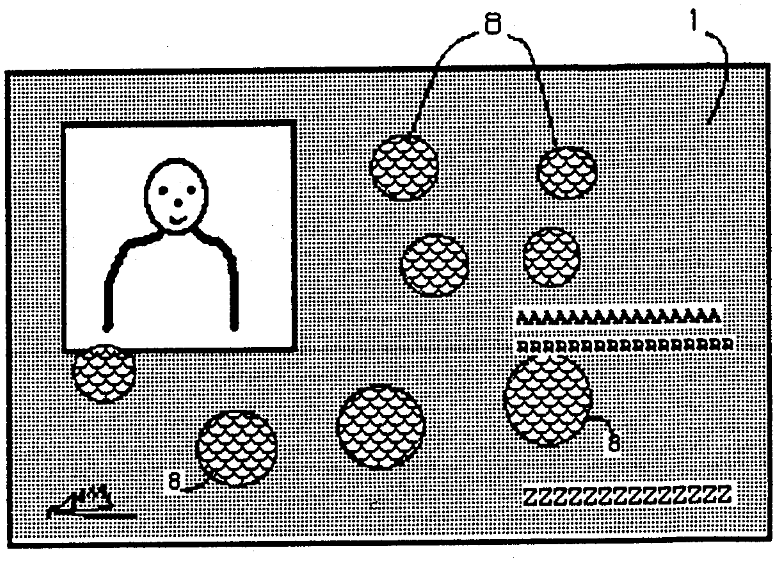
FIG. 2 is a front view of a card on which a tamper attempt has been made.

Should forgers try to dissolve away the protective layers of polyethylene in a solvent bath, the solvent will penetrate into the pigment-retaining holes 6, dissolving the pigment and allowing the resulting colored solution to be absorbed into the walls surrounding the holes by capilarity. This can give rise to warning spots or blobs 8 in the thickness of the paper (see FIG. 2), and these spots may be of some striking color such as blue, red, or black. Pigments having a suitable dispersive power in such solvents can be used to ensure that such warning spots are obtained substantially instantaneously. The microholes may be placed at random, but preferably they are placed at least in the vicinity of the corners in order to foil any attempt at tampering with a portion only of the card, say in the vicinity of just one of its edges. Another preferred disposition of the micro-holes is one which automatically develops into a readily understood warning symbol or message, such as "CANCELLED", or one which literally cancels essential information by obliterating it.

Naturally the present invention is not limited to the specific example described above, and numerous variants are possible within the scope of the accompanying claims. Similarly, the invention is applicable to a wide range of documents other than identity cards.

What is claimed is:

1. A method of protecting security documents of the type comprising uniting a substrate bearing information which is to be protected from tampering, together with transparent protective layers of thermoplastic material heat sealed around said substrate, the method including providing a set of pigment-retaining micro-holes in the substrate, said pigment being soluble in protective layer solvents.

2. A method according to claim 1, wherein the micro-holes are disposed in the substrate in such a manner as to form a warning symbol or mark when made visible by solvent.

3. A security document protected by the method according to claim 1.

4. A security document protected by the method according to claim 2.

* * * * *